United States Patent [19]
Dixon

[11] Patent Number: 6,164,318
[45] Date of Patent: Dec. 26, 2000

[54] VALVE LOCKING SYSTEM

[76] Inventor: Kenneth Dixon, 45301 Butch Gore Rd., Saint Amant, La. 70774

[21] Appl. No.: 09/453,625

[22] Filed: Dec. 3, 1999

[51] Int. Cl.[7] .................................................... F16K 35/00
[52] U.S. Cl. .......................... 137/385; 137/383; 137/384
[58] Field of Search .................................... 137/383, 384, 137/385

[56] References Cited

U.S. PATENT DOCUMENTS

| | | | |
|---|---|---|---|
| 2,342,635 | 2/1944 | Barber et al. | 137/384 |
| 2,342,664 | 2/1944 | Haessler | 137/384 |
| 3,976,095 | 8/1976 | Koch et al. | 137/385 |
| 3,980,099 | 9/1976 | Youngblood | 137/382 |
| 4,397,332 | 8/1983 | Sample | 137/385 |
| 4,681,134 | 7/1987 | Paris Sr. | 137/385 |
| 4,817,663 | 4/1989 | McAndrew | 137/385 |
| 4,860,786 | 8/1989 | Polland | 137/384 |
| 4,962,785 | 10/1990 | Clifford | 137/383 |
| 5,014,528 | 5/1991 | Roberts | 70/177 |
| 5,052,655 | 10/1991 | Ackroyd | 251/95 |
| 5,115,834 | 5/1992 | Champagne | 137/385 |
| 5,143,114 | 9/1992 | Daniels | 137/385 |
| 5,215,112 | 6/1993 | Davison | 137/385 |
| 5,241,982 | 9/1993 | Taylor | 137/384 |
| 5,305,622 | 4/1994 | Flores | 70/177 |
| 5,353,833 | 10/1994 | Martinez | 137/385 |
| 5,427,135 | 6/1995 | Kieper | 137/385 |
| 5,785,074 | 7/1998 | Kieper | 137/68.11 |

*Primary Examiner*—A. Michael Chambers
*Assistant Examiner*—Thomas L. McShane

[57] ABSTRACT

A valve locking system for safely and economically locking out control valves. The valve locking system includes a valve locking assembly for preventing manipulation of a valve including a rotating handle. The handle includes at least one aperture extending through the handle. The assembly includes a brace designed for coupling around a neck of the valve such that the brace is prevented from rotating around the neck of the valve. A cable includes a first end loop and a second end loop. The first end loop is coupled to the brace. The second end of the cable is insertable through the aperture in the handle. A locking member for coupling the first end loop to the second end loop such that the cable ties the handle to the brace whereby the handle is prevented from being rotated.

15 Claims, 2 Drawing Sheets

VALVE LOCKING SYSTEM

BACKGROUND OF THE INVENTION

1. Field of the Invention

The present invention relates to valve locking assemblies and more particularly pertains to a new valve locking system for safely and economically locking out control valves.

2. Description of the Prior Art

The use of valve locking assemblies is known in the prior art. More specifically, valve locking assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,714,856; U.S. Pat. No. 1,986,128; U.S. Pat. No. 5,718,134; U.S. Pat. No. 5,447,043; U.S. Pat. No. Des. 369,088; and U.S. Pat. No. 1,550,487.

While these devices fulfill their respective, particular objectives and requirements, the aforementioned patents do not disclose a new valve locking system. The inventive device includes a valve locking assembly for preventing manipulation of a valve including a rotating handle. The handle includes at least one aperture extending through the handle. The assembly includes a brace designed for coupling around a neck of the valve such that the brace is prevented from rotating around the neck of the valve. A cable includes a first end loop and a second end loop. The first end loop is coupled to the brace. The second end of the cable is insertable through the aperture in the handle. A locking member for coupling the first end loop to the second end loop such that the cable ties the handle to the brace whereby the handle is prevented from being rotated.

In these respects, the valve locking system according to the present invention substantially departs from the conventional concepts and designs of the prior art, and in so doing provides an apparatus primarily developed for the purpose of safely and economically locking out control valves.

SUMMARY OF THE INVENTION

In view of the foregoing disadvantages inherent in the known types of valve locking assemblies now present in the prior art, the present invention provides a new valve locking system construction wherein the same can be utilized for safely and economically locking out control valves.

The general purpose of the present invention, which will be described subsequently in greater detail, is to provide a new valve locking system apparatus and method which has many of the advantages of the valve locking assemblies mentioned heretofore and many novel features that result in a new valve locking system which is not anticipated, rendered obvious, suggested, or even implied by any of the prior art valve locking assemblies, either alone or in any combination thereof.

To attain this, the present invention generally comprises a valve locking assembly for preventing manipulation of a valve including a rotating handle. The handle includes at least one aperture extending through the handle. The assembly includes a brace designed for coupling around a neck of the valve such that the brace is prevented from rotating around the neck of the valve. A cable includes a first end loop and a second end loop. The first end loop is coupled to the brace. The second end of the cable is insertable through the aperture in the handle. A locking member for coupling the first end loop to the second end loop such that the cable ties the handle to the brace whereby the handle is prevented from being rotated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new valve locking system apparatus and method which has many of the advantages of the valve locking assemblies mentioned heretofore and many novel features that result in a new valve locking system which is not anticipated, rendered obvious, suggested, or even implied by any of the prior art valve locking assemblies, either alone or in any combination thereof.

It is another object of the present invention to provide a new valve locking system that may be easily and efficiently manufactured and marketed.

It is a further object of the present invention to provide a new valve locking system that is of a durable and reliable construction.

An even further object of the present invention is to provide a new valve locking system which is susceptible of a low cost of manufacture with regard to both materials and labor, and which accordingly is then susceptible of low prices of sale to the consuming public, thereby making such valve locking system economically available to the buying public.

Still yet another object of the present invention is to provide a new valve locking system which provides in the apparatuses and methods of the prior art some of the advantages thereof, while simultaneously overcoming some of the disadvantages normally associated therewith.

Still another object of the present invention is to provide a new valve locking system for safely and economically locking out control valves.

Yet another object of the present invention is to provide a new valve locking system which includes a valve locking assembly for preventing manipulation of a valve including a rotating handle. The handle includes at least one aperture extending through the handle. The assembly includes a brace designed for coupling around a neck of the valve such that the brace is prevented from rotating around the neck of the valve. A cable includes a first end loop and a second end loop. The first end loop is coupled to the brace. The second end of the cable is insertable through the aperture in the handle. A locking member for coupling the first end loop to the second end loop such that the cable ties the handle to the brace whereby the handle is prevented from being rotated.

Still yet another object of the present invention is to provide a new valve locking system that includes a more economical means of locking a valve in either an open or closed position.

Even still another object of the present invention is to provide a new valve locking system that provides a safer locking device that would not cut or bruise a user trying to open or close a valve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
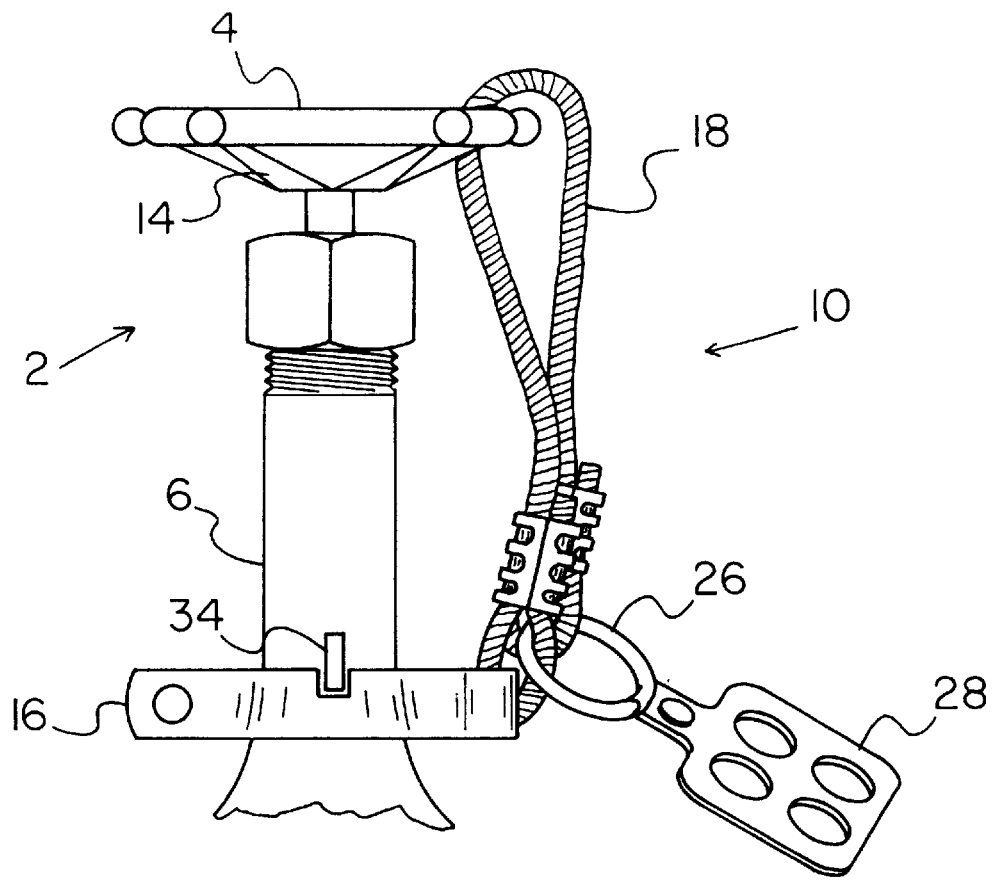
FIG. 1 is a side view of a new valve locking system according to the present invention.
Figure 2:
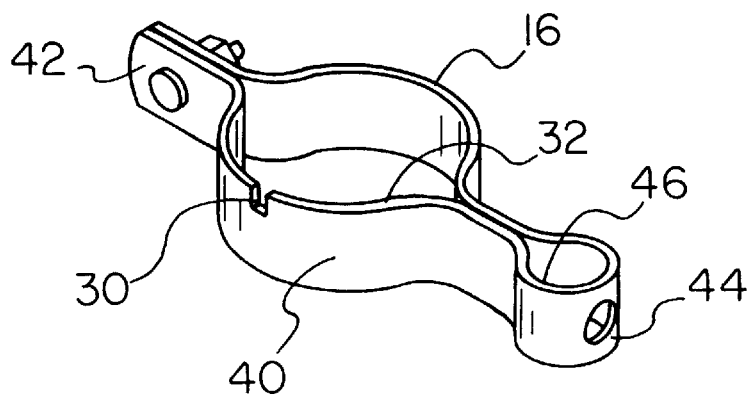
FIG. 2 is a perspective view of the clamp of the present invention.
Figure 3:
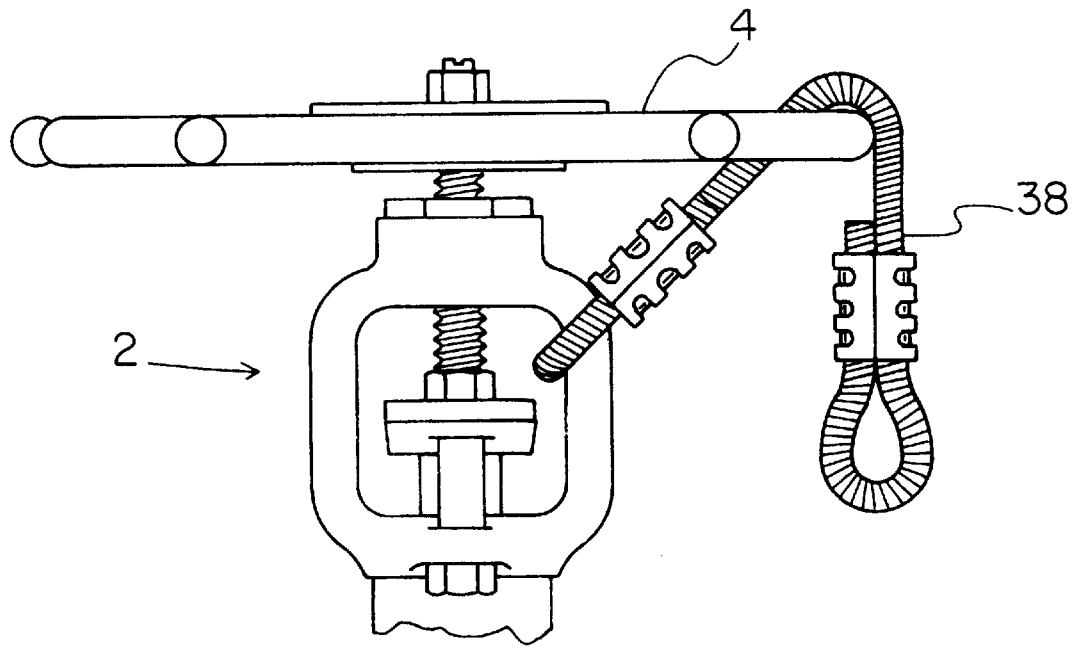
FIG. 3 is a side view of the present invention.
Figure 4:
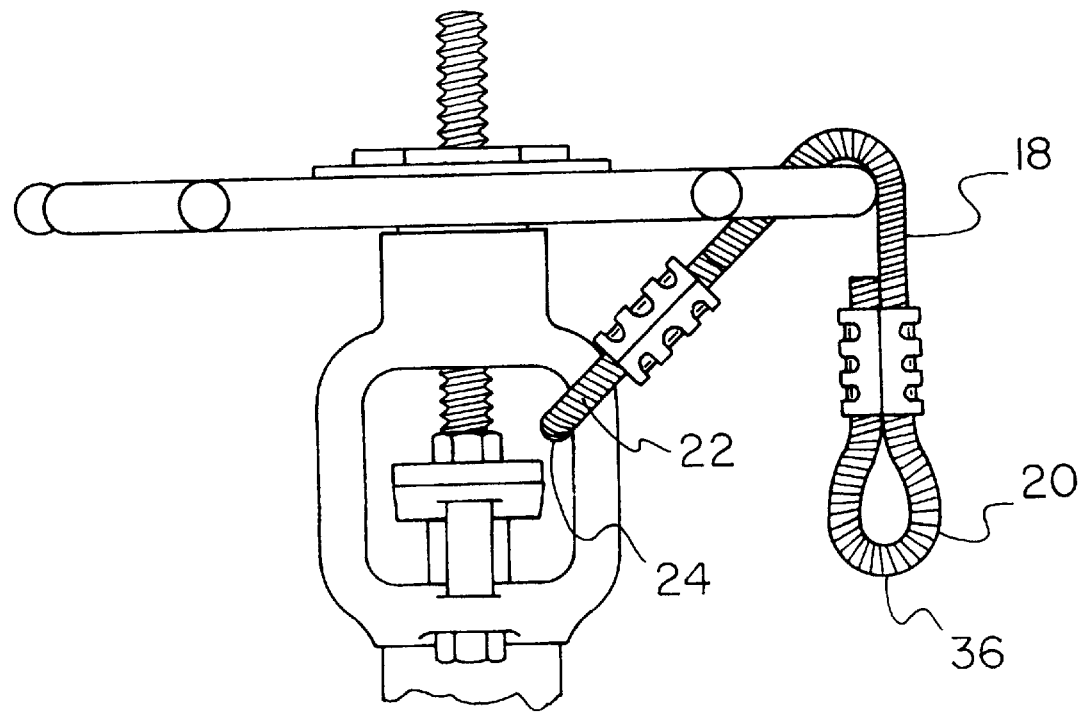
FIG. 4 is a side view of the present invention.

With reference now to the drawings, and in particular to FIGS. 1 through 4 thereof, a new valve locking system embodying the principles and concepts of the present invention and generally designated by the reference numeral 10 will be described.

As best illustrated in FIGS. 1 through 4, the valve locking assbemly 10 is designed for preventing manipulation of a valve 2 that includes a rotating handle 4. The handle 4 is of the type that includes at least one aperture 14 extending through the handle 4. The valve locking assembly 10 generally comprises a brace 16 designed for coupling around a neck 5 of the valve such that the brace is prevented from rotating around the neck of the valve 2. A cable 18 includes a first end loop 20 and a second end loop 22. The first end loop 20 is coupled to the brace 16. The second end of the cable 24 is insertable through the aperture 14 in the handle 4. A locking member 26 is provided for coupling the first end loop 20 to the second end loop 22 such that the cable 18 ties the handle 4 to the brace 16 whereby the handle 4 is prevented from being rotated. In an embodiment, the locking member 26 includes a tag 28 extending from the locking member 26 to provide a visual indicator that the valve 4 is locked out from use.

The brace 16 also includes a slot 30 extending inwardly from an edge 32 of the brace 16. The slot 30 is designed for engaging a protrusion 34 extending outwardly from the neck 6 of the valve 4 whereby the brace 16 is prevented from rotating around the neck 6 of the valve 2 when the slot 30 engages the protrusion 34.

The first end 36 of the cable 18 is clamped to an interior portion 38 of the cable proximate the first end 36 to form the first end loop 20. A second end 24 of the cable 18 is clamped to an interior portion 38 of the cable 18 proximate the second end 24 to form the second end loop 22. The brace 16 includes a medial ring portion 40 designed for engaging the neck 6 of the valve 4. The brace 16 includes a pair of ends 42 couplable to each other to close the medial ring portion 40 around the neck 6 of the valve 4. A distal ring portion 44 is designed for extending outwardly from the neck 6 of the valve 4 when the brace 16 is coupled to the neck 6 of the valve 4. A cable aperture 14 extends through a wall 46 of the distal ring portion 44. The cable 18 passes through the cable aperture 14 whereby the cable 18 is coupled to the distal ring portion 44 of the brace 16. The slot 30 is located in a wall 46 of the medial ring portion 40 of the brace 16.

In use, a user attaches the brace around a neck of the valve such that the brace is prevented from rotating around the neck of the valve. The first end loop of the cable is coupled to the brace and the second end of the cable is inserted through the aperture in the handle. The user now uses a locking member for coupling the first end loop to the second end loop such that the cable ties the handle to the brace whereby the handle of the valve is prevented from being rotated. The locking member includes a tag extending from the locking member that provides a visual indicator that the valve is locked out from use.

For valves having a readily available portion to which the cable ends may be attached, the cable is attachable directly to the valve without using the locking member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve locking assembly for preventing manipulation of a valve having a rotating handle, the handle having at least one aperture extending through the handle, the assembly comprising:

a brace adapted for coupling around a neck of the valve such that said brace is prevented from rotating around the neck of the valve;

a cable having a first end loop and a second end loop, said first end loop being coupled to said brace;

wherein said second end of said cable is insertable through the aperture in the handle;

a locking member for coupling said first end loop to said second end loop such that said cable ties the handle to said brace whereby the handle is prevented from being rotated;

said brace having a slot extending inwardly from an edge of said brace, said slot being adapted for engaging a protrusion extending outwardly from the neck of the valve whereby said brace is prevented from rotating around the neck of the valve when said slot engages the protrusion.

2. The valve locking assembly of claim 1 further comprising:

said locking member including a tag extending from said locking member for providing a visual indicator that the valve is locked out from use.

3. The valve locking assembly of claim 1, further comprising:

a first end of said cable being clamped to an interior portion of said cable proximate said first end to form said first end loop; and a second end of said cable being clamped to an interior portion of said cable proximate said second end to form said second end loop.

4. A valve locking assembly for preventing manipulation of a valve having a rotating handle, the handle having at least one aperture extending through the handle, the assembly comprising:

a brace adapted for coupling around a neck of the valve such that said brace is prevented from rotating around the neck of the valve;

a cable having a first end loop and a second end loop, said first end loop being coupled to said brace;

wherein said second end of said cable is insertable through the aperture in the handle;

a locking member for coupling said first end loop to said second end loop such that said cable ties the handle to said brace whereby the handle is prevented from being rotated;

said brace having a medial ring portion adapted for engaging the neck of the valve;

said brace having a pair of ends couplable to each other to close said medial ring portion around the neck of the valve; and a distal ring portion adapted for extending outwardly from the neck of the valve when said brace is coupled to the neck of the valve.

5. The valve locking assembly of claim 4, further comprising:

a cable aperture extending through a wall of said distal ring portion, said cable passing through said cable aperture whereby said cable is coupled to said distal ring portion of said brace.

6. The valve locking assembly of claim 1, further comprising:

said brace having a medial ring portion adapted for engaging the neck of the valve;

said slot being located in a wall of said medial ring portion of said brace.

7. A valve locking assembly comprising:

a valve having a handle, said handle having at least one aperture extending through said handle;

said valve having an opening passing orthogonally through a medial portion of a neck of said valve for forming a generally O-shaped neck portion;

a cable having a first end loop and a second end loop, said first end loop being coupled to said neck portion of said valve;

wherein said second end of said cable is insertable through the aperture in said handle;

a locking member for coupling said first end loop to said second end loop such that said cable ties said handle to said neck portion of said valve whereby said handle is prevented from being rotated.

8. The valve locking assembly of claim 7, further comprising: said locking member including a tag extending from said locking member for providing a visual indicator that the valve is locked out from use.

9. The valve locking assembly of claim 7, further comprising:

a first end of said cable being clamped to an interior portion of said cable proximate said first end to form said first end loop; and a second end of said cable being clamped to an interior portion of said cable proximate said second end to form said second end loop.

10. A valve locking assembly for preventing manipulation of a valve having a rotating handle, the handle having at least one aperture extending through the handle, the assembly comprising:

a brace adapted for coupling around a neck of the valve such that said brace is prevented from rotating around the neck of the valve;

a cable having a first end loop and a second end loop, said first end loop being coupled to said brace;

wherein said second end of said cable is insertable through the aperture in the handle;

a locking member for coupling said first end loop to said second end loop such that said cable ties the handle to said brace whereby the handle is prevented from being rotated;

said locking member including a tag extending from said locking member for providing a visual indicator that the valve is locked out from use;

said brace having a slot extending inwardly from an edge of said brace, said slot being adapted for engaging a protrusion extending outwardly from the neck of the valve whereby said brace is prevented from rotating around the neck of the valve when said slot engages the protrusion;

a first end of said cable being clamped to an interior portion of said cable proximate said first end to form said first end loop;

a second end of said cable being clamped to an interior portion of said cable proximate said second end to form said second end loop;

said brace having a medial ring portion adapted for engaging the neck of the valve;

said brace having a pair of ends couplable to each other to close said medial ring portion around the neck of the valve;

a distal ring portion adapted for extending outwardly from the neck of the valve when said brace is coupled to the neck of the valve;

a cable aperture extending through a wall of said distal ring portion, said cable passing through said cable aperture whereby said cable is coupled to said distal ring portion of said brace; and said slot being located in a wall of said medial ring portion of said brace.

11. The valve locking assembly of claim 4, further comprising:

said locking member including a tag extending from said locking member for providing a visual indicator that the valve is locked out from use.

12. The valve locking assembly of claim 4, further comprising:

a first end of said cable being clamped to an interior portion of said cable proximate said first end to form said first end loop; and a second end of said cable being clamped to an interior portion of said cable proximate said second end to form said second end loop.

13. The valve locking assembly of claim 7, further comprising:

said O-shaped neck portion having a central axis positioned substantially parallel to a plane in which said handle lies.

14. The valve locking assembly of claim 13, further comprising:

said locking member including a tag extending from said locking member for providing a visual indicator that the valve is locked out from use.

15. The valve locking assembly of claim 13, further comprising:

a first end of said cable being clamped to an interior portion of said cable proximate said first end to form said first end loop; and a second end of said cable being clamped to an interior portion of said cable proximate said second end to form said second end loop.

* * * * *